Nov. 30, 1943.  R. W. DUNTEMAN  2,335,656
ROUTER
Filed May 24, 1943
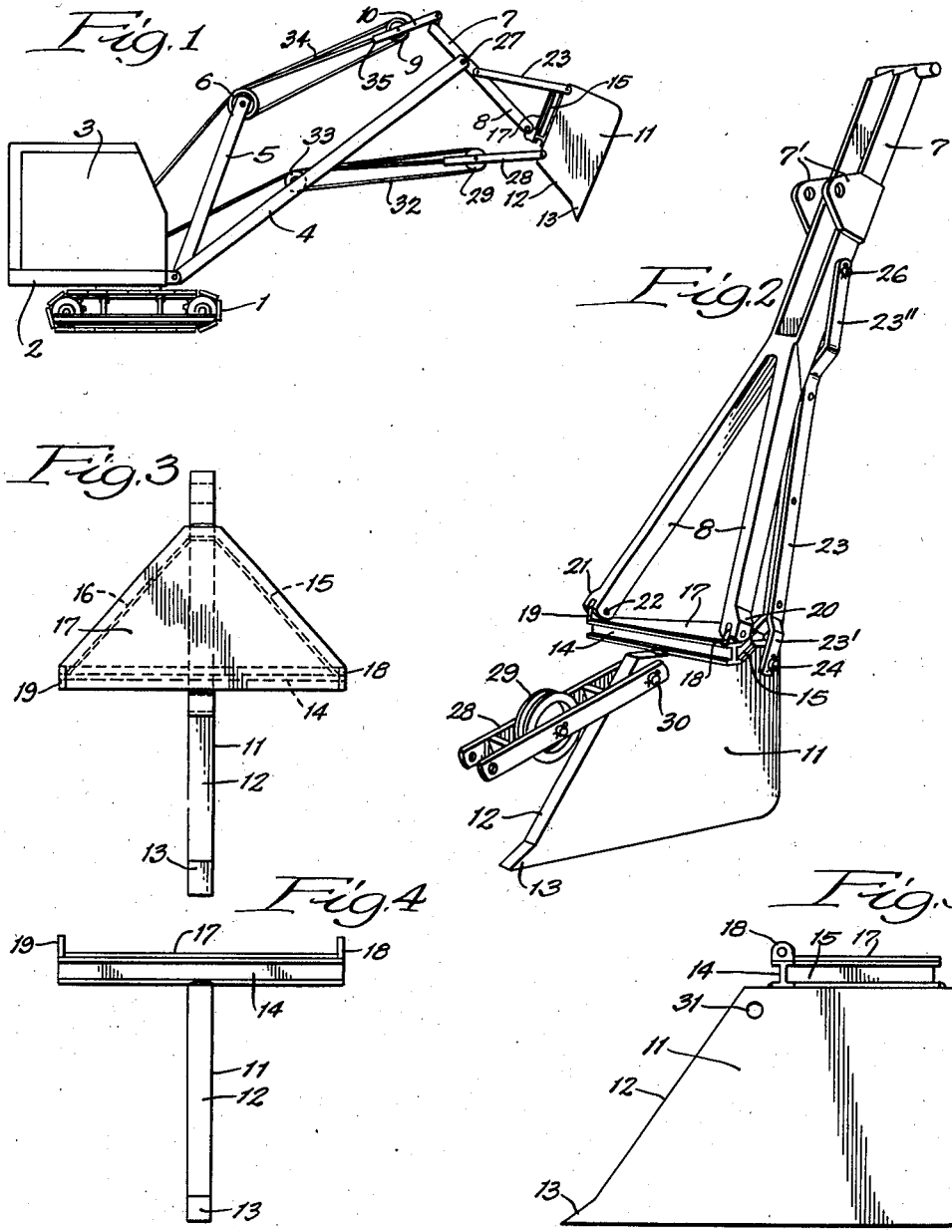
Inventor:
Roland W. Dunteman, Patented Nov. 30, 1943

2,335,656

UNITED STATES PATENT OFFICE 2,335,656

ROUTER

Roland W. Dunteman, Bensonville, Ill.

Application May 24, 1943, Serial No. 488,158

1 Claim. (Cl. 262—8)

This invention relates to improvements in apparatus for breaking up frozen ground, macadam roads, soft rocks, or any material that must be first broken up before it can be handled with a power shovel in excavating operations.

Heretofore much loss of time and breakage of equipment was experienced by excavating contractors when they attempted excavation operations in the winter time while the ground was frozen. Attempts to excavate resulted in broken teeth on the shovel bucket, and other parts of the excavating apparatus were broken under the severe strains and stresses to which they were put. Macadam roads and soft rocks might well be compared to frozen ground because the shovel of an excavating apparatus is neither designed nor adapted to act as a hammer or other apparatus to break up material prior to its being deposited in the bucket. Furthermore, the normal width of excavating buckets is usually three feet, hence the ability to enter a solid mass is practically nil since the bucket enters the ground, under normal circumstances, at an angle and no appreciable bite can be had unless the material to be moved is relatively soft. It therefore follows that excavating during the winter months, when the ground is frozen, is practically an impossibility and use of excavating apparatus per se to tear up macadam roads and soft stone is also impracticable, without first employing pneumatic hammers and the like to break up the surface; hence long and unnecessary delays are experienced by excavating contractors. In periods like the present, where time is the essence, all unnecessary delays should be eliminated.

It was to overcome these inherent defects that the present invention was conceived.

The main objects of this invention are to provide an improved apparatus for uprooting and breaking up solid masses, such as frozen ground, macadam roads and soft stone and the like; to provide such an apparatus which is readily attachable to a power excavating apparatus and quickly substituted for the bucket; to provide such an apparatus wherein the router is of narrow width as compared with the length and height and the forward end lies in a diagonal plane terminating at its lowermost edge in a toothed surface; and to provide a device of this character which is simple in construction and operation, inexpensive to manufacture and contains no parts which can get out of order.

An illustrative embodiment of this invention is shown in the accompanying drawing, in which:

Figure 1 is a side view of a power shovel apparatus showing my improved routing apparatus attached thereto in place of the usual bucket.

Fig. 2 is a perspective view of my improved router shown attached to the shovel arm and other auxiliary apparatus.

Fig. 3 is a top plan view of my improved router shown detached from the shovel arm.

Figs. 4 and 5 are front and side views, respectively, of the same.

The excavating apparatus to which my invention is preferably adaptable is known as the pull shovel which comprises the usual crawler apparatus 1, a swingable platform 2 having a cab 3 mounted thereon containing the usual machinery and power drums (not shown), a boom 4, a vertically disposed pivoted mast or column 5 having a sheave 6 secured on its free end. A shovel arm 7 is pivotally secured to the free end of the boom and is provided with a yoke 8. A sheave 9 is secured in a bail 10 which in turn is pivotally secured to the upper end of the shovel arm 7.

All this aforedescribed apparatus is conventional in the art and so well known no additional detailed description is believed to be necessary.

The present invention is directed to an improved router, plow share or wedge which comprises a relatively thin (preferably about 2½ inches) elongated solid steel or iron plate 11 having a diagonally disposed leading forward edge 12 terminating at its lowermost portion into a tooth 13, which may or may not be replaceable, as is well known in the "bucket tooth" art. The preferable dimensions of my improved router is four feet long at its bottom edge and 2½ feet long at its upper edge, and having a height of 2½ feet. I have inserted preferable dimensions herein to make certain that any relative terms I employ in the claim will have a definite meaning. However, it is to be understood that the dimensions given are in no manner critical and may be altered without departing from the spirit of the invention.

In order to provide a means to secure my router to the yoke 8, I weld or otherwise permanently secure a transversely extending I-beam 14 to the upper edge of the plate 11 and strengthen the same by a pair of rearwardly extending channel irons 15—16 which are welded or otherwise secured one end to the beam 14 and the other end to plate 11. The beam 14 and channel irons 15—16 may then be additionally strengthened by welding a V-plate 17 thereon.

In order to secure the router to the yoke 8, I provide a pair of upstanding ears 18—19 integrally secured on the I-beam 14 which are arranged to be pivotally secured in the jaws 20—21 of the yoke 8 by means of a pivot pin 22.

A supporting arm 23 having a pair of yokes 23' and 23" is pivotally secured at its lower end to the upper rear end of the plate 11 by clevis pin 24 which is threaded through the aperture 25 in the plate 11. The upper end of the arm 23 is pivotally secured to the shovel arm 7 by pivot pin 26. The shovel arm 7 is pivotally connected to the boom 4 by pivot pin 27 which extends through apertures in the upstanding ears 7' and a corresponding aperture in the end of the boom 4.

A bail or link arm 28, having a sheave 29 journaled therein, is pivotally secured to the plate 11 by clevis pin 30 which extends through aperture 31 in the plate 11.

A hauling line 32 is attached to the free end of the bail 28 and passes around the sheave 33, back around the sheave 29, over the sheave 32 and then connected to the usual power drum, not shown, mounted on the platform 2.

The hauling line 32 provides the forward pull for the plate 11 in the same manner as it does for the excavating bucket it replaces.

The hoisting line 34 is dead ended as at 35 on the bail 10 and its intermediate portions trained around the sheaves 6 and 9 and then extended and secured to and wound on the usual hoisting drum, not shown, mounted on the platform 2.

The plate 11 is carried by and secured to the lower end of the shovel arm 7 and is so disposed as to face the machine when it is being drawn forwardly by the hauling line, and face downwardly toward the ground when the shovel arm is in an extended position. Because of the ready maneuverability of the plate 11, the depth of the cuts can readily be controlled so that if too big a bite is taken, the plate can be backed out and fresh start made.

It can now be seen that because of the solidity of this construction frozen ground may be readily broken up and also because of the flexibility of operation any depth of cut desired may be made.

It requires only a relatively short period of time to remove the usual bucket from the shovel arm and substitute my improved router and vice versa when the router has broken up the solid mass, so that the bucket may again be employed to readily move the broken and uprooted mass.

Although but one specific embodiment of this invention is herein shown and described, it will be understood that numerous details may be altered or omitted without departing from the spirit of the invention as defined by the following claim.

I claim:

A router apparatus for breaking up solid masses such as frozen ground or the like and adapted to be secured to a power driven excavating machine having a boom and a shovel arm, an elongated narrow solid plate having a diagonally disposed forward leading edge terminating in a tooth at the lower portion of said plate, a beam integrally secured to the upper edge of said plate and disposed transversely to said plate, said plate being pivotally secured to said shovel arm, means to retain said plate in a vertical position.

ROLAND W. DUNTEMAN.